US011657232B2

(12) United States Patent
Vaithiyanathan

(10) Patent No.: US 11,657,232 B2
(45) Date of Patent: *May 23, 2023

(54) SOURCE CODE COMPILER USING NATURAL LANGUAGE INPUT

(71) Applicant: Bank of America Corporation, Charlotte, NC (US)

(72) Inventor: Vidhya Vaithiyanathan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,440

(22) Filed: Oct. 8, 2021

(65) Prior Publication Data

US 2022/0027566 A1 Jan. 27, 2022

Related U.S. Application Data

(63) Continuation of application No. 16/793,219, filed on Feb. 18, 2020, now Pat. No. 11,176,329.

(51) Int. Cl.
*G06F 40/30* (2020.01)
*G06F 8/77* (2018.01)
(Continued)

(52) U.S. Cl.
CPC ............. *G06F 40/30* (2020.01); *G06F 8/33* (2013.01); *G06F 8/36* (2013.01); *G06F 8/73* (2013.01); *G06F 8/77* (2013.01); *G06F 16/33* (2019.01)

(58) Field of Classification Search
CPC ... G06F 40/30; G06F 8/30; G06F 8/33; G06F 8/36; G06F 8/427; G06F 8/436;
(Continued)

(56) References Cited

U.S. PATENT DOCUMENTS 4,942,526 A 7/1990 Atsushi et al.
5,311,429 A 5/1994 Tominaga
(Continued)

OTHER PUBLICATIONS

Arabyarmohamady, S., et al., A Coding Style-based Plagiarism Detection, Proceedings of 2012 International Conference on Interactive Mobile and Computer Aided Learning (IMCL), Nov. 6-8, 2012, pp. 180-186, [retrieved on May 5, 2021], Retrieved from the Internet: <URL:http://ieeexplore.ieee.org/>.
(Continued)

*Primary Examiner* — Geoffrey R St Leger

(57) ABSTRACT

A system includes a source code repository which stores source code entries, which include instructions in a programming language for performing computing tasks. A code generator receives an input which includes a request to perform a first computing task. Keywords, including a variable-associated keyword and a function-related keyword, are identified in the input. Code-line entries are determined which, when executed in an ordered combination, achieve the first computing task. Based on the variable-associated keyword, variables appearing in the source code repository are determined to declare in order to perform the first computing task. Based on the function-related keyword, functions appearing in the source code repository are determined to define and call to perform the first computing task. A custom code is generated, in the programming language.

17 Claims, 8 Drawing Sheets

(51) Int. Cl.
*G06F 8/73* (2018.01)
*G06F 8/36* (2018.01)
*G06F 16/33* (2019.01)
*G06F 8/33* (2018.01)

(58) Field of Classification Search
CPC ..... G06F 8/70; G06F 8/73; G06F 8/75; G06F 8/77; G06F 16/33
USPC .......................... 717/106–109, 120, 123, 143
See application file for complete search history.

(56) References Cited

U.S. PATENT DOCUMENTS

| | | | |
|---|---|---|---|
| 5,649,200 A | 7/1997 | Leblang et al. | |
| 5,878,386 A | 3/1999 | Coughlin | |
| 6,434,524 B1 | 8/2002 | Weber | |
| 6,594,823 B1 | 7/2003 | Corbin et al. | |
| 6,757,893 B1 | 6/2004 | Haikin | |
| 6,760,695 B1 | 7/2004 | Kuno et al. | |
| 6,879,956 B1 | 4/2005 | Honda et al. | |
| 6,901,399 B1 | 5/2005 | Corston et al. | |
| 7,127,712 B1 | 10/2006 | Noble et al. | |
| 7,269,547 B2 | 9/2007 | Pentheroudakis et al. | |
| 7,346,897 B2 | 3/2008 | Vargas | |
| 7,568,109 B2 | 7/2009 | Powell, Jr. et al. | |
| 7,707,566 B2 | 4/2010 | Grover et al. | |
| 7,765,097 B1 | 7/2010 | Yu et al. | |
| 8,046,741 B2 | 10/2011 | Bhogal et al. | |
| 8,086,869 B2 | 12/2011 | Powell, Jr. et al. | |
| 8,332,828 B2 | 12/2012 | Vargas | |
| 8,495,100 B2 | 7/2013 | Cheung | |
| 8,527,262 B2 | 9/2013 | Kambhatla et al. | |
| 8,683,430 B2 | 3/2014 | Gonzales et al. | |
| 8,688,676 B2 | 4/2014 | Rush et al. | |
| 8,739,134 B2 | 5/2014 | Baron | |
| 8,856,725 B1 | 10/2014 | Anderson et al. | |
| 9,176,729 B2 | 11/2015 | Mockus et al. | |
| 9,280,322 B2 | 3/2016 | Reyes Lozano et al. | |
| 9,323,923 B2 | 4/2016 | Cecchetti et al. | |
| 9,619,209 B1 | 4/2017 | Allen et al. | |
| 9,710,461 B2 | 7/2017 | Smith et al. | |
| 9,727,736 B1 | 8/2017 | Mcclintock et al. | |
| 9,766,868 B2 | 9/2017 | Allen et al. | |
| 9,824,122 B2 | 11/2017 | Simitsis et al. | |
| 9,928,040 B2 | 3/2018 | Tarlow et al. | |
| 9,946,785 B2 | 4/2018 | Allen et al. | |
| 10,048,945 B1 | 8/2018 | Makkar | |
| 10,127,214 B2 | 11/2018 | Munro et al. | |
| 10,146,673 B2 | 12/2018 | Koren et al. | |
| 10,817,264 B1 * | 10/2020 | Goodsitt | G06F 8/33 |
| 2002/0013694 A1 | 1/2002 | Murata et al. | |
| 2004/0122791 A1 | 6/2004 | Sea et al. | |
| 2006/0089942 A1 | 4/2006 | Sutter et al. | |
| 2006/0200803 A1 | 9/2006 | Neumann et al. | |
| 2006/0271920 A1 | 11/2006 | Abouelsaadat | |
| 2007/0299825 A1 | 12/2007 | Rush et al. | |
| 2008/0301639 A1 | 12/2008 | Bell et al. | |
| 2009/0254881 A1 | 10/2009 | Johnson et al. | |
| 2010/0050155 A1 | 2/2010 | Iwama et al. | |
| 2010/0146491 A1 | 6/2010 | Hirano et al. | |
| 2011/0107309 A1 | 5/2011 | Baron | |
| 2012/0253783 A1 | 10/2012 | Castelli et al. | |
| 2013/0340076 A1 | 12/2013 | Cecchetti et al. | |
| 2014/0280110 A1 | 9/2014 | Simitsis et al. | |
| 2015/0340033 A1 | 11/2015 | Di Fabbrizio et al. | |
| 2017/0123963 A1 | 5/2017 | Koren et al. | |
| 2018/0081881 A1 | 3/2018 | Poddar et al. | |
| 2020/0110600 A1 | 4/2020 | Weldemariam et al. | |
| 2021/0256122 A1 | 8/2021 | Vaithiyanathan | |
| 2021/0256217 A1 | 8/2021 | Vaithiyanathan | |

OTHER PUBLICATIONS

Kimmig, Markus, et al., Querying Source Code with Natural Language, 2011 26th IEEE/ACM International Conference on Automated Software Engineering (ASE 2011), Nov. 6-10, 2011, pp. 376-379, [retrieved on May 4, 2021], Retrieved from the Internet: < URL:http://ieeexplore.ieee.org/>.

Reiss, S., Automatic Code Stylizing, ASE '07: Proceedings of the twenty-second IEEE/ACM international conference on Automated software engineering, Nov. 2007, pp. 74-83, [retrieved on Sep. 15, 2021], Retrieved from the Internet: <URL:http://dl.acm.org/>.

Markovtsev, V., t al., Style-Analyzer: fixing code style inconsistencies with interpretable unsupervised algorithms, MSR '19: Proceedings of the 16th International Conference on Mining Software Repositories, May 2019, pp. 468-478, [retrieved on Sep. 15, 2021], Retrieved from the Internet: <URL:http://dl.acm.org/>.

Nguyen, T., et al., Personalized Code Recommendation, IEEE International Conference on Software Maintenance and Evolution ( ICSME), Sep. 29-Oct. 4, 2019, pp. 313-317, [retrieved on Sep. 15, 2021], Retrieved from the Internet: <URL:http://ieeexplore.ieee.org/. >.

Corbo, F., et al., Smart Formatter: Learning Coding Style from Existing Source Code, IEEE International Conference on Software Maintenance, Oct. 2-5, 2007, pp. 525-526, [retrieved on Sep. 15, 2021], Retrieved from the Internet: <URL:http://ieeexplore.ieee.org/>.

* cited by examiner

SOURCE CODE COMPILER USING NATURAL LANGUAGE INPUT

CROSS-REFERENCE TO RELATED APPLICATIONS

This application is a continuation of U.S. patent application Ser. No. 16/793,219 filed Feb. 18, 2020, by Vidhya Vaithiyanathan, and entitled "SOURCE CODE COMPILER USING NATURAL LANGUAGE INPUT," which is incorporated herein by reference.

TECHNICAL FIELD

The present disclosure relates generally to establishing and maintaining source code. More particularly, in certain embodiments, the present disclosure is related to a source code compiler using natural language input.

BACKGROUND

Source code is programming code presented in a human-readable programming language (e.g., as opposed to binary machine code). A given program, or computing task, may be implemented using source code. Specialized training and knowledge of a source code's programming language is generally required to both understand the function(s) of a given piece of source code and to create new code using the source code as a starting point to perform a desired task.

SUMMARY

In an embodiment, a system includes a source code repository configured to store source code entries created by a plurality of users. Each source code entry includes instructions in a programming language for performing a computing task. A style repository is configured to store a style profile for each of the plurality of users. Each style profile includes predefined style features associated with formatting characteristics of the stored source code entries for a corresponding user. A source code analyzer is communicatively coupled to the source code repository and the style repository. A processor of the source code analyzer receives, from a first user, a first source code which includes instructions in the programming language for performing a first computing task. First style features of the first source code are determined. The first style features include characteristics of a format of the first source code. The processor determines whether the first style features correspond to first predefined style features indicated by a first style profile associated with the first user. In response to determining that this is the case, the source code is stored in the source code repository. In response to determining that this is not the case, storage of the first source code in the source code repository is prevented.

In yet another embodiment, a system includes a source code repository which stores source code entries, which include instructions in a programming language for performing computing tasks. A code generator receives, from a user, an input which includes a request in a natural language to perform a first computing task. Keywords are identified in the input. The keywords include a variable-associated keyword and a function-related keyword. Based on the identified keywords, code-line entries are determined which, when executed in an ordered combination, achieve the first computing task. The code-line entries include a variable-declaration entry, a function-definition entry, and a function-call entry. Based on the variable-associated keyword, one or more variables appearing in the source code repository are determined to declare in order to perform the first computing task. Based on the function-associated keyword, one or more functions appearing in the source code repository are determined to define and call to perform the first computing task. A custom code is generated, in the programming language, which includes a declaration of the determined variables at the variable-declaration entry, a definition of the determined function(s) at the function-definition entry, and a call to the determined function(s) using the declared variables at the function-call entry.

This disclosure encompasses the recognition of previously unidentified problems associated with previous technology used to maintain collections of source code and adapting this source code to generate code to perform a desired task or function. For instance, previous approaches to storing source code generally relied on programmers to manually annotate code with comments and save the code in a fashion that allowed future use. However, different users tend to have different approaches to writing code in the programming language and formatting the code, resulting in source code entries that may be of limited use to others (i.e., because the purpose of the code is difficult or impossible to decipher). Using previous technology, multiple copies of the same or similar source code may be stored that perform the same function, resulting in inefficient use of computing resources. Moreover, using previous technology, a preferred source code (e.g., a most efficient source code, or a source code with a particular style or format) may not be used as a starting point for generating new programming code because there was previously no means for identifying this preferred source code. Previous technology also fails to detect and correct problematic source code (e.g., whether the code is incorrectly formatted for a given task, includes inefficient protocols, or is intentionally malicious).

Certain embodiments of the systems, methods, and device of this disclosure provide unique solutions to these newly recognized problems described above and other technical problems by facilitating the reliable storage of source code and the efficient generation of new, customized code. For example, the disclosed system provides several technical advantages which include 1) automatic detection and correction of any anomalies in the source code prior to its storage for future use; 2) determination of natural language descriptions of source code (e.g., of "stories"), which can be easily interpreted even without specialized knowledge and training in a programming language; 3) the efficient and reliable generation of new source code for a custom task and with a user-specific style; and 4) the provision of candidate source code to a user's query to perform a given task and/or for source code related to a given entity or group with which the user is affiliated.

As such, the system described in this disclosure may improve the function of computer systems used to store source code for future use and generate new source code. The system may also or alternatively reduce or eliminate practical and technical barriers to repurposing existing source code for to perform new functions or tasks. The system described in this disclosure may particularly be integrated into a practical application for storing source code used to perform calculations using a first set of variables and/or functions, and automatically repurposing this code to perform the same or similar calculations using a second set of user-identified variables and/or functions without manually modifying the underlying programming language in the source code (i.e., without writing any code in a specialized programming language).

Certain embodiments of this disclosure are related to a source code analyzer which determines whether newly provided code is appropriate for storage and future use as source code. For instance, style features can be extracted from the source code and used to identify anomalies in order to detect unapproved or malicious source code. The source code analyzer may generate a repository of natural language descriptions of source code, or "stories," which may include specialized badges, or tags, which link portions of the descriptions (and/or the associated lines of the corresponding source code) to particular formulas, business units and the like. Examples of such embodiments are described below with respect to FIGS. 1-5.

Certain embodiments of this disclosure are related to a custom code generator which uses natural language inputs (e.g., commands) and/or other queries from a user to generate custom code. Generated code can be automatically customized according to the user input and adjusted to match a user's predetermined coding style (e.g., number and length of comments, spacing and indentation format, and the like). Examples of such embodiments are described below with respect to FIGS. 1 and 6-7.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably maintaining records of established source code and effectively leveraging such records of source code to create new code to perform a desired task or function. Using previous technology, the generation of a new programming code based on stored source code is technically challenging and inefficient. A user generally requires specialized knowledge of a particular programming language used to write the code. Even with this knowledge, significant time can be expended attempting to understand and successfully repurpose existing source code. In many cases, in an effort to avoid these challenges, a programmer may create an all new code, effectively wasting the existing source code (and the associated technical resources used to store and maintain a record of source code).

Various embodiments of this disclosure may solve these and/or other technical problems associated with previous technology. For instance, in certain embodiments, this disclosure facilitates the efficient maintenance of a source code repository and, optionally, a story repository, which stores natural-language descriptions of stored source code (e.g., as described with respect to FIGS. 1-5). In certain embodiments, this disclosure includes a custom code generator which facilitates the generation of customized code in an efficient and user-friendly manner (e.g., as described with respect to FIGS. 1 and 6-7)

As used in this disclosure, a natural language corresponds to a an established language (e.g., English) used for human-to-human communication. As used in the disclosure, a programming language refers to a formalized text-based language which includes instructions for implementing functions and/or tasks using a computer. Examples of programming languages include C, C++, C #, Python, JAVA, HTML, and the like. These programming languages are provided for example only. This disclosure contemplates the use of any programming language.

Source Code Maintenance and Generation System

Figure 1:
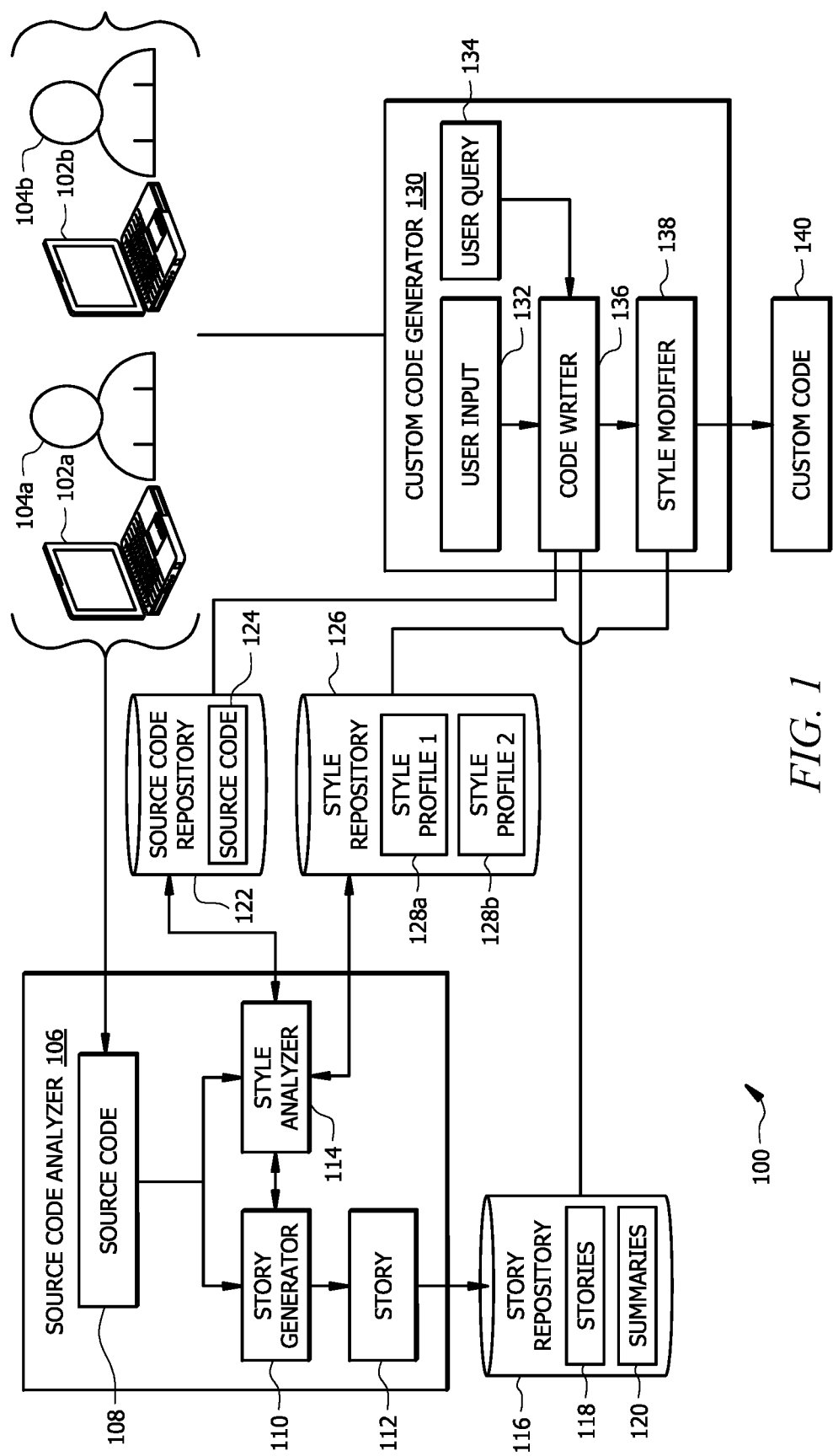
FIG. 1 is a schematic diagram of an example system for source code maintenance and generation, according to an illustrative embodiment of this disclosure.

FIG. 1 is a schematic diagram of an example system 100 for source code maintenance and generation. The system 100 includes user devices 102*a,b*, a source code analyzer 106, a story repository 116, a source code repository 122, a style repository 126, and a custom code generator 130. The source code analyzer 106 of system 100 is generally configured to receive source code 108 from a particular user 104*a,b* and detect any possible anomalies in the source code 108 before the source code 108 is stored in the source code repository 122 (e.g., as stored source code 124). For example, the style analyzer 114 may detect anomalies associated with style features in the source code 108, and, if an anomaly is detected, the source code 108 may be corrected prior to its storage in the source code repository 122. Further examples of the implementation of the source code analyzer 106 are described below and with respect to FIGS. 2-5. The custom code generator 130 is generally configured to receive a user input 132, which includes instructions for performing desired computing tasks in a natural language, and generate a corresponding custom code 140 in an appropriate programming language for implementing the task. Further examples of the implementation of the custom code generator 130 are described below and with respect to FIGS. 6 and 7.

User devices 102*a,b* are generally any computing devices operable to receive user input associated with source code 108 and communicate the source code 108 to the source code analyzer 106. For instance, a user device 102*a,b* may include an appropriate interface and input device for inputting a source code 108. Source code 108 includes instructions in a programming language for performing a computing task (e.g., a calculation). In addition to instructions in a programming language, source code 108 may include comments which are written in a natural language and provide context or a brief description of the purpose of certain lines or sections of the code 108. User devices 102*a,b* may also be operable to provide a user input 132 and/or user query 134 to the custom code generator 130. For example, each of the user devices 102a,b may be a computer or a mobile device. In the illustrative example of FIG. 1, device 102a is associated with a first user 104a, while user device 102b is associated with a second user 104b.

As described in greater detail below, whether source code 108 is provided to the source code analyzer 106 by the first computing device 102a associated with the first user 104a or the second computing device 102b associated with the second user 104b may determine how the source code 108 is analyzed and subsequently stored in the source code repository 122 (e.g. or prevented from being stored in the source code repository 122). As also described in greater detail below, whether user input 132 and/or query 134 is provided to the code generator 130 by the first computing device 102a associated with a first user 104a or the second computing device 102b associated with a second user 104b may determine how custom code 140 is generated (e.g., in an appropriate user-specific fashion). Devices 102a,b may be implemented using the hardware, memory, and interface of device 800 described with respect to FIG. 8 below Source code analyzer 106 may be any computing device, or collection of computing devices, configured to receive source code 108 from user devices 102a,b and analyze the source code 108. The source code analyzer 106 may be configured to review received source code 108, detect any anomalies in the source code, and correct the anomalies when possible/appropriate. The source code analyzer 106 may be implemented using the hardware, memory, and interface of device 800 described with respect to FIG. 8 below. In some embodiments, the source code analyzer 106 may be implemented on a user device 102a,b (e.g., using appropriate instructions stored in a memory of the device 102a,b and executed by a processor of the device 102a,b). In other embodiments, the source code analyzer 106 may be implemented using a separate device, or a collection of computing devices (e.g., configured as a server).

As illustrated in FIG. 1, the source code analyzer 106 may include a story generator 110 and a style analyzer 114. The story generator 110 generally determines, for the source code 108, a corresponding story 112. The story 112 is a natural language description of instructions included in the source code 108. The source code analyzer 106 may store the story 112 in the story repository 116 (e.g., as one of the stories 118). The generated story 112 is generally stored such that it is associated with the source code 108. This allows the story 112 to be reviewed at a later time by a user 104a,b and allows the user 104a,b to identify the corresponding source code 108. In some embodiments, the story 112 may be determined in a first language (e.g., English) and subsequently translated to a more appropriate language for a given user 104a,b (e.g., a preferred language for the user 104a,b). Example implementation of the story generator 110 is described in greater detail below with respect to FIGS. 4-5.

The style analyzer 114 generally determines style features of the source code 108 and determines, based at least in part on these style features, whether to store the source code 108 in the source code repository 122, modify the source code 108 prior to its storage, or whether to prevent storage of the source code 108. For instance, the style analyzer 114 may detect anomalies in style features of the source code 108 (e.g., irregular use of comments, spaces, and/or punctuation in the source code and/or in the comments, e.g., changes to language in the comments or to the variable naming conventions). The style analyzer 114 may automatically edit the format of the source code 108 to correct the anomalies prior to storing the edited source code 108 in the source code repository 122 (e.g., as an entry of stored source code 124).

If the anomalies are severe, the style analyzer 114 may prevent storage of the source code 108. In some cases, the style analyzer 114, rather than permanently preventing the storage of source code 108 with detected anomaly(ies), the source code 108 may be flagged for human review, and the source code may 108 may be prevented from being stored at least until results of such a review are received. Examples of detected anomalies include a length of indentations in the source code 108 that is outside of a predefined range, location of gap lines (i.e., empty lines of code) in the source code 108 not conforming to predefined conventions, a frequency of gap lines in the source code 108 that is outside of a predefined range, a frequency and/or location of punctuation in the source code 108 that does not conform to predefined conventions, a number of spaces following variables or other text in a line of the source code 108 that is outside a predefined range, and the like.

In order to facilitate these and other functionalities of the style analyzer 114, the style analyzer 114 may determine and store style profiles 128a,b for corresponding users 104a,b in the style repository 126. Style profiles 128a,b generally store the predefined style features that have been determined for the corresponding users 104a,b (e.g., based on previous code prepared by these users 104a,b). The style profiles 128a,b may be used to aid in detecting anomalous source code 108 (e.g., if source code 108 received from a given user 104a,b does not include style features which correspond to those of that user's style profile 128a,b) and to generate custom code using the custom code generator 130 (described further below). Example implementation of the style analyzer 114 is described in greater detail below with respect to FIGS. 2-3.

The story repository 116 is generally a data store, or database, configured to store stories 118 (e.g., natural-language descriptions of the source code 124 stored in the source code repository 122). Stories 118 may include the story 112 generated for the source code 108 along with descriptions of other source code 124 previously received by the source code analyzer 106, as described briefly above and in greater detail below with respect to FIGS. 4-5. Each entry of source code 124 may have a corresponding story 118 in the story repository 116. The story repository 116 may also store summaries 120 of the stories (e.g., more succinct versions of the stories 118). This disclosure contemplates story repository 116 storing information (e.g., stories 118 and/or summaries 120) arranged in any appropriate format. The story repository 116 may be stored in memory of a dedicated device and/or in a memory of one or more of the user devices 102a,b, source code analyzer 106, and custom code generator 130. The story repository 116 may be implemented using the hardware, memory, and interface of device 800 described with respect to FIG. 8 below.

The story repository 116 may provide further insights for improving the efficiency associated with storing source code 124 in the source code repository 122. For instance, in some embodiments, source code 124 with the same or similar stories 118, or summaries 120, may be associated with one another. Such related source code may be flagged for review to identify differences in the source code 124 and/or determine a preferred entry of source code 124 to use in the future. For instance, a preferred code 124 may be retained in the source code repository 122, while a non-preferred entry of source code 124 with the same or a similar story 118 (e.g., less efficient code for performing the same task) may be discarded.

The source code repository 122 is generally a data store, or database, configured to store source code 124. Source code 124 may include the source code 108 as received or as-edited by the source code analyzer 106, as described briefly above and in greater detail below with respect to FIG. 2-3. The source code repository 122 also stores previously received source code 124. This disclosure contemplates source code repository 122 storing information (e.g., source code 124) arranged in any appropriate format. The source code repository 122 may be stored in memory of a dedicated device and/or in a memory of one or more of the user devices 102a,b, source code analyzer 106, and the custom code generator 130. The source code repository 122 may be implemented using the hardware, memory, and interface of device 800 described with respect to FIG. 8 below.

The style repository 126 is generally a data store, or database, configured to store style profiles 128a,b for users 104a,b. The style repository 126 may be implemented using the hardware, memory, and interface of device 800 described with respect to FIG. 8 below. Each style profile 128a,b is generally associated with a corresponding user 104a,b and reflects the formatting conventions commonly used by the users 104a,b when writing in the programming language used to prepare source code 108. As such, each style profile 128a,b generally includes predefined style features associated with how the users 104a,b prepare (or are expected to prepare) source code 108. As a non-limiting example, the style profiles 128a,b may store user-specific features such as the length and/or frequency of indentations in the source code 108 by the corresponding user 102a,b when writing in the programming language, location of gap lines in source code 108, frequency of gap lines in source code 108 generated by the corresponding user 102a,b when writing in the programming language, the frequency and/or location of punctuation (e.g., colons, semicolons) and/or use of capitalization in comments in the source code 108 by the corresponding user 102a,b when writing in the programming language, the frequency and/or location of comments (e.g., before functions, after variable declarations), and a number of gaps (i.e., empty lines) following a line in in the source code 108 prepared by the corresponding user 102a,b when writing in the programming language. The style profiles 128a,b may also include threshold ranges by which a style feature can differ from a predefined style feature for the user 104a,b before an anomaly is detected. The implementation of style profiles 128a,b is described in greater detail with respect to FIG. 3 below.

The style profiles 128a,b may be determined using a number of source code entries (e.g., stored as entries 124 in the source code repository 122) prepared by the users 104a,b over a period of time (e.g., weeks or months). For instance, the style profiles 128a,b may be determined using a set of heuristics and/or using appropriate method of machine learning. This disclosure contemplates style repository 126 storing information (e.g., style profiles 128a,b) arranged in any appropriate format. The style repository 126 may be stored in memory of a dedicated device and/or in a memory of one or more of the user devices 102a,b, source code analyzer 106, and custom code generator 130.

The custom code generator 130 is generally configured to receive a user input 132, which includes text in a natural language (e.g., English or any other appropriate language for the users 104a,b), and generate corresponding custom code 140. For instance, the user input 132 may include a description of a computing task a user 104a,b desires the source code 140 to perform. The code writer 136 may use information in the story repository 116 and/or the source code repository 122 to identify and modify, as needed, portions of the stored source code 124 to generate custom code 140. For example, the code writer 136 may identify keywords in the user input 132 that are linked with portions of stories 118 and provide the corresponding source code 124 to the user 104a,b. As another example, if a portion of the user input 132 is the same as, or similar to a portion of a story 118, the code writer 136 may use the source code 124 that corresponds to this portion of the story 118 in order to write the custom code 140.

The custom code generator 130 may also include a style modifier 138, which is generally configured to edit (e.g., or "fix") the style of code generated by the code writer 136 such that custom code 140 has a style that is aligned with the user's style profile 128a,b. The style modifier 138 generally employs the style profiles 128a,b to perform such modifications. In some embodiments, the source code generator 130 facilitates the efficient and reliable repurposing of stored source code 124, which may be associated with a first task or function (e.g., for performing calculations using a first set of variables and/or functions associated with a first entity or business unit), into a custom code 140, which is configured for a different task or function (e.g., for performing calculations using a second set of variables and/or functions associated with a second entity or business unit) without requiring any technical or programming expertise from the user 104a,b who provided the natural-language input 132. An example operation of the custom code generator is described in greater detail below with respect to FIG. 6. The custom code generator 130 may be implemented using the hardware, memory, and interface of device 800 described with respect to FIG. 8 below In an example operation of the system 100, a user 104a,b provides source code 108 to the source code analyzer 106 for storage in the source code repository 122. The style analyzer 114 determines whether the source code 108 meets certain criteria for storing the source code in the source code repository 122. For instance, the style analyzer may determine whether style features of the source code 108 correspond to the expected style features indicated by the user's style profile 128a,b. An example of this is described with respect to FIG. 3 below. If the style features are not within an expected range, the code 108 may be edited so that the style of the code 108 is brought into accordance with the user's style profile 128a,b before the code 108 is stored in the source code repository 122. In some cases, code 108 may be flagged for further review and storage of the code 108 may be prevented at least for a period of time (e.g., at least until results of administrator review are received indicating the code 108 is approved for storage). In some cases, the source code analyzer 106 may also or alternatively determine a natural language description, or story 112, for the source code 108. The story 112 may be stored in the story repository 116 for future use, for example, by the custom code generator 130. Further examples of the operation of the source code analyzer 106 are described below with respect to FIGS. 2-5.

In another example operation of the system 100, a natural-language user input 132 is provided by a user 104a,b to the custom code generator 130. The code writer 136 may use stories 118 from the story repository 116 and source code 124 from the source code repository 122 to generate custom code 140, based on the user input 132. For instance, keywords identified in the user input 132 may be matched to those of the stories 118. Source code 124 associated with the matching stories 118 may be appropriately combined to generate the custom code 140. In some cases, the style modifier 138 uses the style profiles 128a,b to modify the style of the custom code 140 such that it matches a predefined programming style for the user 104a,b (e.g., in accordance with style profiles 128a,b). In some cases the user input 132 may further include feedback to the custom code generator 130, which may be used to improve performance of the code writer 136 and/or style modifier 138. In some cases, a user 104a,b may further edit the custom code 140 by providing a user query 134, which includes a search phrase or other request to identify appropriate existing source code 124 to include in the custom code 140. Further examples of the operation of the custom code generator 130 are described below with respect to FIGS. 6 and 7.

Style Analyzer of the Source Code Analyzer

Figure 2:
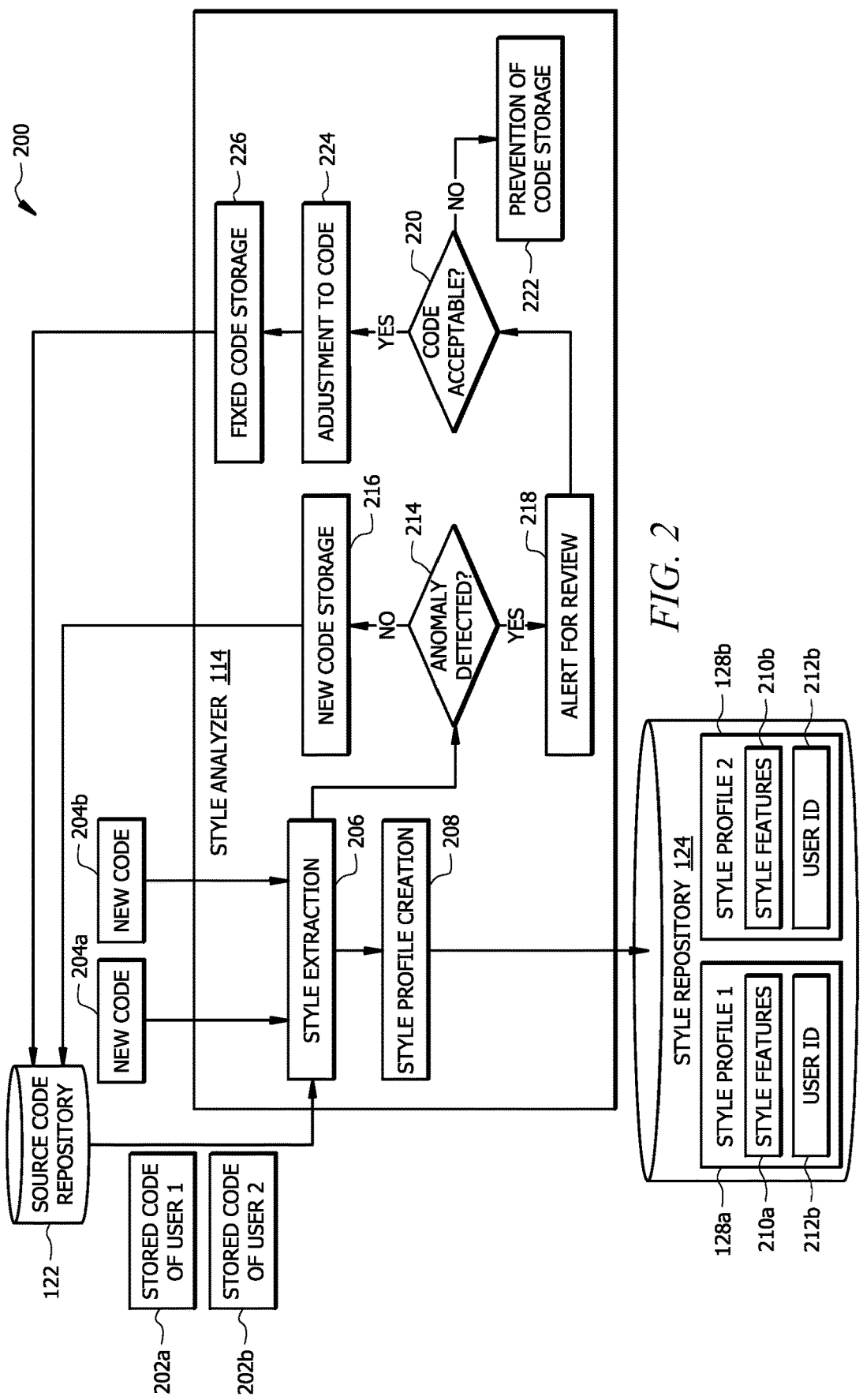
FIG. 2 is a flow diagram illustrating an example operation of the style analyzer of the system illustrated in FIG. 1.

FIG. 2 shows a flow diagram 200 illustrating example operation of the style analyzer 114 of the source code analyzer 106. In this illustrative example, the style analyzer 114 receives previously stored code 202a associated with user 104a and previously stored code 202b associated with user 104b. The previously stored code 202a,b may be received from the source code repository (i.e., the code 202a,b may be included in the stored source code 124 of FIG. 1) Stored source code 202a may correspond to a first set of source code (e.g., instructions written in a programming language) associated with (e.g., generated by) first user 104a of FIG. 1, and stored source code 202b may correspond to a second set of source code (e.g., instructions written in a programming language) associated with (e.g., generated by) second user 104b of FIG. 1. The style analyzer 114 uses the previously stored code 202a,b to determine style profiles 128a,b for the users 104a,b. As explained further below, these style profiles 128a,b may be employed by the style analyzer 114 to evaluate new source code 204a,b received from users 104a,b.

Following receipt of the stored code 202a,b, style extraction 206 is performed. Style extraction 206 generally involves the determination of style features 210a,b for the stored code 202a,b associated with the users 104a,b. For example, style extraction 206 may involve determining style features 210a,b prevalent in (e.g., commonly found in) the source code 202a,b. As an example, the style features 210a,b may include one or more of a length of indentations in the source code 202a,b, location of gap lines (e.g., whether empty lines are left after comments, calls to functions, or the like) in the source code 202a,b, a frequency of gap lines (e.g., how frequently empty lines are found in) the source code 202a,b, a frequency and/or location of punctuation in the source code 202a,b (e.g., how often periods, commas, semicolons, and the like appear in the source code 202a,b and/or whether such punctuation is commonly found in comments, calls to functions, following variables, etc.), and the like. The style features 210a,b are not limited to these example features and may include any other appropriate features associated with a format or style of source code 202a,b.

Following style extraction 206, the style analyzer 114 proceeds to creation 208 of style profiles 128a,b. Profile creation 208 involves associating the determined style features 210a,b with a user identifier 212a,b for the user 104a,b who generated the associated stored code 202a,b. The style profiles 128a,b are generally stored in the style repository 126, such that this information is available for future use, for example, by the style analyzer 114 and the custom code generator 130 (see FIG. 1).

When new source code 204a,b is received by the style analyzer 114, the style analyzer 114 may proceed with style extraction 206, similarly to as described above. For example, the style analyzer 114 may determine new style features 210a,b for the received source code 204a,b. The style analyzer 114 then makes a determination 214 of whether an anomaly is detected in the source code 204a,b. The determination 214 may employ machine learning or artificial intelligence to determine whether the new code 204a,b has a style that corresponds to that of the appropriate style profile 128a,b and can, thus, reliably be stored in the source code repository 122. For example, a machine learning model may be trained based on the previous source code 202a,b (i.e., and any other appropriate source code 124 associated with the style profile 128a,b). Also or alternatively determination 214 may involve one or more heuristics or rules to determine if the new code 204a,b has a style that corresponds to that of the appropriate style profile 128a,b or an anomaly (e.g., a style anomaly) is detected.

Figure 3:
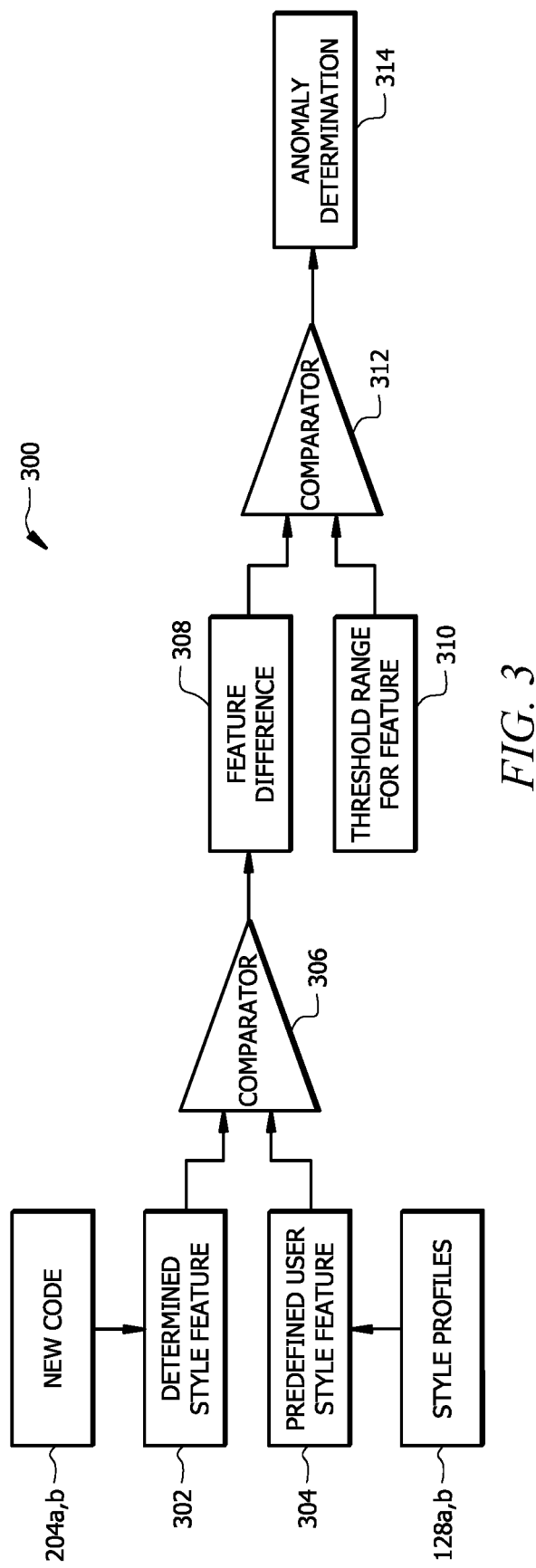
FIG. 3 is a flow diagram illustrating the determination of code anomalies.

FIG. 3 is a diagram 300 illustrating an example of anomaly determination 214 in greater detail. As shown in FIG. 3, a newly determined style feature 302 is compared to a corresponding predefined style feature 304. The determined style feature 302 may be any of the example style features 210a,b described above, or any other appropriate feature associated with the formatting of the new code 204a,b. The predefined style feature 304 may be one of the style features 210a,b for the user 104a,b who provided the new source code 204a,b being analyzed (see also FIGS. 1 and 2).

A comparator 306 is used to compare the determined style feature 302 to the corresponding predefined style feature 304 in order to determine a feature difference 308 (e.g., an extent to which the determined feature 302 is different from the predefined style feature 304). The feature difference 308 may correspond, for example, to a value by which another value associated with the determined style feature 302 is different from a value associated with the predefined style feature 304. For instance, if the determined feature 302 indicates that the new code 204a,b includes zero gap lines (i.e., empty lines of the code 204a,b) after a call to a function and the predefined style feature 304 indicates that the user 104a,b who provided the new code 204a,b typically includes two gap lines after a call to a function, the comparator 306 may determine a difference 308 with a value of two (i.e., 2 expected gap lines−0 observed gap lines=2 gap lines).

The feature difference 308 is compared to a threshold range 310 via a second comparator 312 to determine whether the difference 308 is within a threshold range 310. The threshold range 310 generally corresponds to an amount that the determined feature 302 can differ from the predefined feature 304. The threshold range 310 for a given feature type may be different for each user 104a,b (e.g., as determined by the style profiles 128a,b). For instance, if the determined style feature 302 indicates that the new code 204a,b of FIG. 2 does not include any empty lines (i.e., "gap lines") after a called function, and the corresponding predefined feature 310 indicates that the user 104a,b usually includes two gap lines after each call to a function, the calculated difference 308 is two (i.e., 2 gap lines−0 gap lines=2 gap lines), as described in the example above. In this example, the threshold range 310 may be a range from negative one to positive one (i.e., indicating that an expected number of gap lines for the user 104a,b (e.g., as indicated by the user's style profile 128a,b) may be the value associated with the predefined style feature 304 plus or minus one). In this example, the feature difference 308 of two gap lines is not within the threshold range 310, and, therefore, the feature 302 fails to correspond to the user's style profile 128a,b, resulting in an anomaly determination 314 that is positive.

If the feature difference 308 is within the threshold range 310, the comparator 312 generally determines that the feature 302 has a negative anomaly determination 314 (i.e., an anomaly is not detected for the feature 302). A negative anomaly determination 314 generally indicates that the feature 302 is in agreement with the user's style profile 128a,b, and an anomaly is not detected at determination 214 of FIG. 2. However, if the feature difference 308 is not within the threshold range 310, the anomaly determination 314 is positive, indicating that the feature 302 is not in agreement with the user's style profile 128a,b, and an anomaly is detected at determination 214 of FIG. 2. In some embodiments, a plurality of features 302 for a given entry of new code 204a,b are evaluated according to the process illustrated in FIG. 3. In such cases, at least a minimum number of features 302 must be within the threshold as determined by comparator 312 in order for an anomaly not to be detected at determination 214 of FIG. 2. For example, at least 80% of the features 302 may need to have a negative anomaly determination 314 in order for an anomaly not to be detected at determination 214 of FIG. 2. If fewer than the minimum number of features 302 has a negative anomaly determination 314, an anomaly is detected at step 214 of FIG. 2.

Referring again to FIG. 2, if an anomaly is not detected at determination 214, the style analyzer 114 proceeds to storage 216 of the code 204a,b. The code 204a,b is generally stored in the source code repository 122 of FIG. 1, for example, such that the new code 202a,b is subsequently available to aid in the generation of custom code 140 by the source code generator 130, as described in greater detail below.

In some embodiments, if an anomaly is detected at determination 214, the style analyzer 114 may provide an alert 218 indicating review of the code 204a,b is needed. For instance, having been determined to be anomalous, the code 204a,b may be provided to an administrator for review. The administrator may determine whether the code 204a,b is acceptable (e.g., whether anomalies in the code 204a,b are associated with malicious intent (not acceptable) or whether detected anomalies are associated with error or some other non-malicious intent. The results 220 of this review may be used to determine whether the style analyzer 114 should proceed to prevention 222 of storage of the source code 204a,b or to editing 224 the source code 204a,b. In other embodiments (e.g., if an alert 218 is not provided), the determination 214 may provide further instructions for determining if the code 204a,b is acceptable at 220 for storage 226 after being edited 224 or if the style analyzer 114 should prevent 222 storage of the code 204a,b.

If an anomaly was detected at determination 214 and the code is acceptable at 220, the style analyzer 114 may automatically edit (e.g., "fix") 224 the source code 204a,b. For example, referring to the example of FIG. 3, if the determined feature difference 308 is outside of the threshold range 310, the code 204a,b may be edited such that the feature difference 308 is brought back within the threshold range 310. For example, in the context of the example described above with respect to FIG. 3, if the determined feature indicated the presence of zero gap lines after a function call and the corresponding predefined feature 304 indicated two gap lines should follow a function call, the style analyzer 114 may modify 224 the code 204a,b such that two gap lines are added after a function call. The style analyzer 114 then stores 226 the edited code 204a,b in the source code repository 122 (e.g., as an entry of the source code 124 of FIG. 1). In some embodiments (e.g., where an alert 218 is not provided), the above-described edits 224 to the code 204a,b may be performed following a positive determination 214 of a style anomaly (e.g., in response to determining that a determined feature difference 308 of FIG. 3 is outside the corresponding threshold range 310).

If an anomaly was detected at determination 214 and the code is not acceptable at 220 (e.g., in response to determining that a feature difference 308 of FIG. 3 is not within the threshold range 310 indicated by the user's style profile 128a,b), the style analyzer 114 prevents storage 222 of the first source code in the source code repository 122. In some embodiments (e.g., where an alert 218 is not provided), the style analyzer 114 may determine that prevention 222 of code storage is appropriate based on one or more of the number of style feature differences 308 of FIG. 3 that are not within the corresponding threshold ranges 310, the extent to which one or more of the feature differences 308 depart from the corresponding acceptable threshold ranges 310, and the like. For instance, in some cases, at least two determined style features 302 of a given code 204a,b must fail the comparison performed by comparator 312 of FIG. 3 in order for the style analyzer 114 to automatically prevent storage 222 of the code 204a,b. For example, both the number of gap lines following a call to function and the length of comments may have to be outside a predefined range in order for a positive anomaly determination 314 to be made. In some cases, a feature difference 308 of FIG. 3 must be outside the corresponding threshold range 310 by a minimum amount in order to proceed to prevention 222 of storage of the code 204a,b. For example, if the difference between a determined feature 302 and a predefined feature 304 is four (e.g., if a code 204a,b included six gap lines following a call to a function rather than the expected two gap lines for that user 104a,b), and the threshold range is from negative one to one, this example feature difference 308 of four would be outside the threshold range 310 by greater than a minimum amount of three.

In some embodiments, the style analyzer 114 may detect entries of source code 124 which have been intentionally altered (e.g., maliciously altered) and stored in the source code repository 122. For instance, the style analyzer 114 may intermittently check the stored source code 124 and identify inconsistencies or changes in the source code 124 over time. For instance if a given entry of the stored source code 124 has no or less than a threshold number of anomalies (see FIG. 3 and corresponding description above) at a first time stamp and an increase in anomalies is detected at a second time stamp after the first time stamp, the style analyzer 114 may flag this entry of source code 124 for further review. The style analyzer 114 may change a permission flag on this entry of the source code 124 to prevent use of the code until it has passed further review. For instance, an altered permission of this entry of source code 124 may prevent the source code 124 from being used by the custom code generator 130 (described in greater detail below). This may provide further improvements to the security and reliability of the stored source code 124.

In some cases, the style analyzer 114 may search for personal information that is included in the stored source code 124. For instance, the style analyzer 114 may search for and flag any personal user information (e.g., user names, addresses, account numbers). This information may be automatically removed if not necessary for implementation of the code 124. Also or alternatively, this information may be automatically anonymized to prevent its compromise. This may provide further improved data security to the source code analyzer 106 of FIG. 1.

In some embodiments, the style analyzer 114 may search for keywords associated with known problems in the source code 124. For instance, the style analyzer 114 may search predefined words and/or phrases such as "to do," "fix me," "please fix," and the like. An administrator may identify such terms commonly used by users 104a,b to identify that a portion of code 124 is not complete or requires attention. These terms may be searched for, and any stored code 124 containing these terms may be flagged for further review and/or correction. In some embodiments, the style analyzer 114 may detect unused and/or redundant objects or functions in stored source code 124. These unused and/or redundant items may be automatically removed from the source code 124, thereby making both the source code repository 122 and the stored source code 124 more efficient.

Story Generator of the Source Code Analyzer

Figure 4:
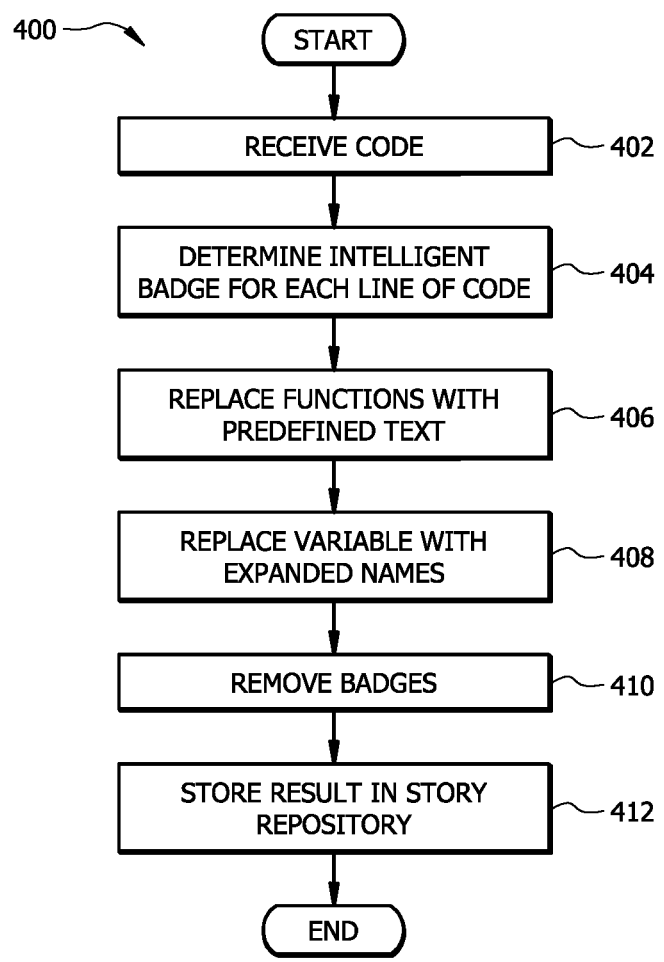
FIG. 4 is a flowchart of a method for operating the story generator of the system illustrated in FIG. 1.

FIG. 4 is a flowchart of an example method 400 of story generation. The story generator 110 may implement method 300 to generate the story 112 of FIG. 1. The method 400 generally facilitates the determination of a corresponding description, in a natural language, of the instructions included in the source code 108 for performing a task or function and the subsequent storage of this natural-language description, or story 112, in the story repository 116.

Method 400 may begin at step 402 where source code 108 is received by the story generator 110. For instance, a user 104a,b may provide the source code 108 to the source code analyzer 108, as described above with respect to FIG. 1. At step 404, the story generator 110 determines, for each line of the source code 108, a badge associated with a programming task. For example, a badge may be associated with a description of the programming function associated with the line of the source code 108, or the information included in the line of the source code 108.

Figure 5:
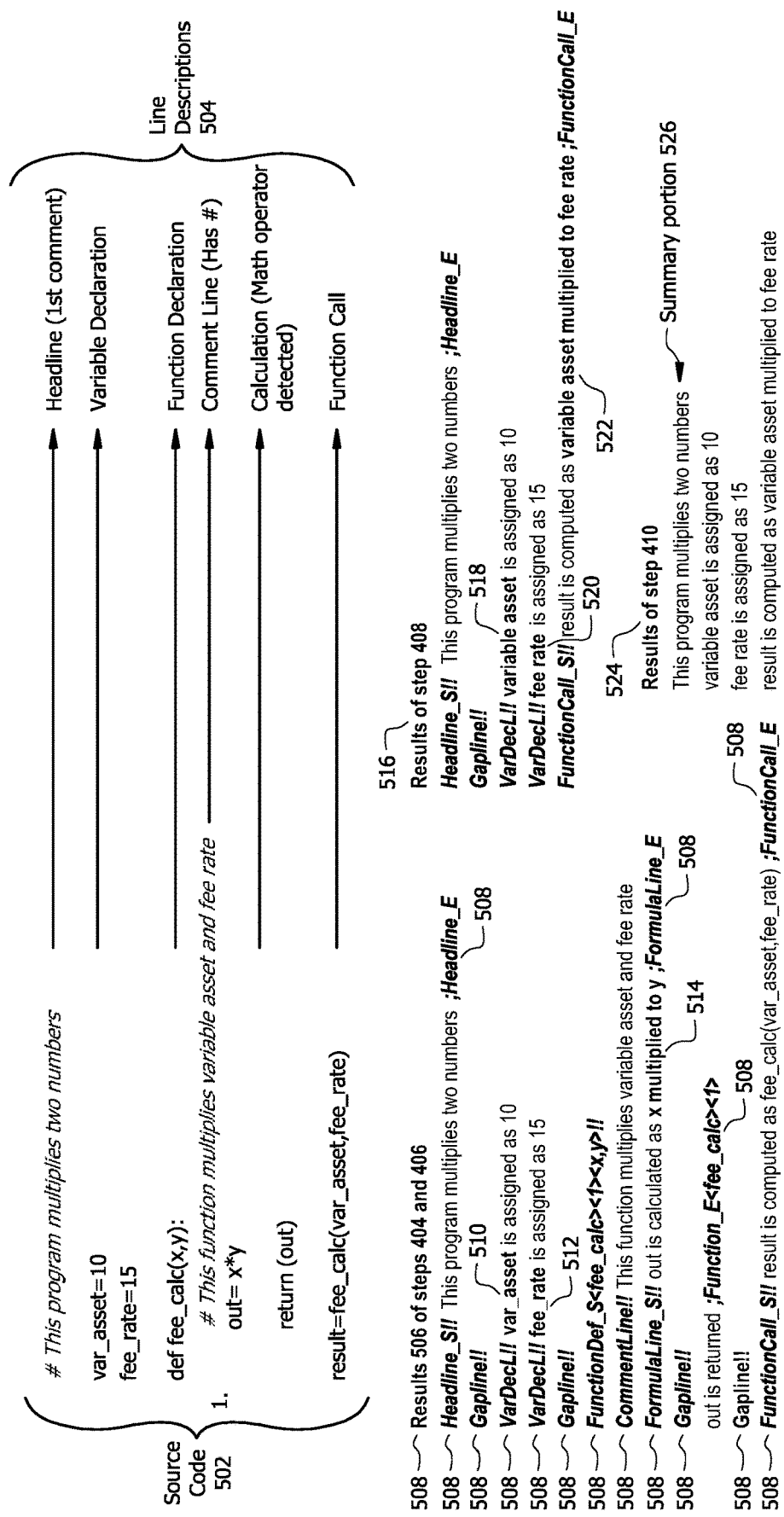
FIG. 5 illustrates example source code and example results generated at various steps of the method of FIG. 4.

For illustrative purposes, FIG. 5 shows an example code portion 502, which may be included in source code 108. Each line of code portion 502 has a corresponding line description 504. For example, the comment at the top of code portion 502 has a corresponding line description 504 of "Headline," while the second comment in the code portion 502 has a corresponding line description 504 of "Comment Line." At step 404 of FIG. 4, the story generator 110 determines these descriptions 504 and uses them to determine a corresponding intelligent badge 508 for each line of the source code 108.

At step 406 functions appearing in the source code 108 are replaced with predefined text which describes the functions. For instance, an equal sign, when used to define a variable value in the source code 108, may be replaced with the text "is assigned as." When an equal sign is used as part of an arithmetic function (e.g., "out=x*y" in the example of FIG. 5), the equal sign may be replaced with a phrase such as "is calculated as," "is computed as," or the like. This facilitates the transformation of otherwise abstract functions and arithmetic symbols into readily interpretable natural language. FIG. 5 illustrates example results 506 of steps 404 and 406 of method 400, after the story generator 110 has determined intelligent badges 508 and replaced functions with corresponding text (e.g., "out=x*y" from code portion 502 is replaced with "out is calculated as x multiplied to y" in results 506). The intelligent badges 508 are illustrated in bold and italic font.

Referring again to FIG. 4, at step 408, the story generator 110 replaces variable names with predefined variable text. As an example, FIG. 5 illustrates the results 516 of replacing variables 510, 512, 514 with corresponding text 518, 520, 522 at step 408. For instance, step 408 of FIG. 4 may involve replacing the "var_asset" variable 510 and "fee_rate" variable 512 in the code portion 502 with corresponding text descriptions of "variable asset" 518 and "fee rate" 520, as shown in the progression from results 506 to results 516 in FIG. 5. As another example, step 408 of FIG. 4 may involve embedding function definitions inside the results of a called function and replacing variable names with descriptions of the variables. For instance, as illustrated in FIG. 5, "result=fee_calc(var_asset, fee_rate)" in results 506 is transformed into "result is computed as variable asset multiplied to fee rate" in results 516 of step 408.

At step 410, the story generator 110 removes the badges to generate a natural language story 112 for the original source code 108. FIG. 5 illustrates the results 524 of step 410. Results 524 are an example of a story 112, or a portion of a story 112. In some cases, the badges 508 are retained in the story (e.g., such that the results 516 are included in the sty 112). In such cases, all of the results 124 (i.e., rather than only line 526) may be retained as the summaries 120. Retaining the badges 508 in the story 112 may be beneficial for operation of the custom code generator 130, because the badges 508 can be used to more effectively associate stories 118 to keywords in the user input 132 and find appropriate stored source code 124 as a starting point for generating custom code 140, as described in greater detail below.

At step 412, the story generator 110 stores the resulting story 112 in the story repository 116. As illustrated in FIG. 5, in some cases, the results 524 (e.g., the story 112) may include a summary portion 526, which may be stored as one of the summaries 120 of FIG. 1. The summary portion 526 generally provides a high level and readily searchable overview of the function of the source code portion 502.

Custom Code Generator

As described above with respect to FIG. 1 the custom code generator 130 facilitates the reliable and user-friendly generation of custom code 140 based on natural language input 132. The custom code 140 may include instructions written in any appropriate programming language for performing one or more user-desired tasks or functions. The user input 132 generally involves little or no previous knowledge from the users 104a,b of the programming language of the custom code 140. In some cases, a user query 134 may be received by the custom code generator 136 and used to identify stories 118 which are related to the query 134. If a user selects one of the identified stories 118, the stored source code 124 that is associated with the selected story 118 may be provided to the user 104a,b. This may further facilitate the efficient generation of custom code 140 for performing desired computing tasks or functions.

Figure 6:
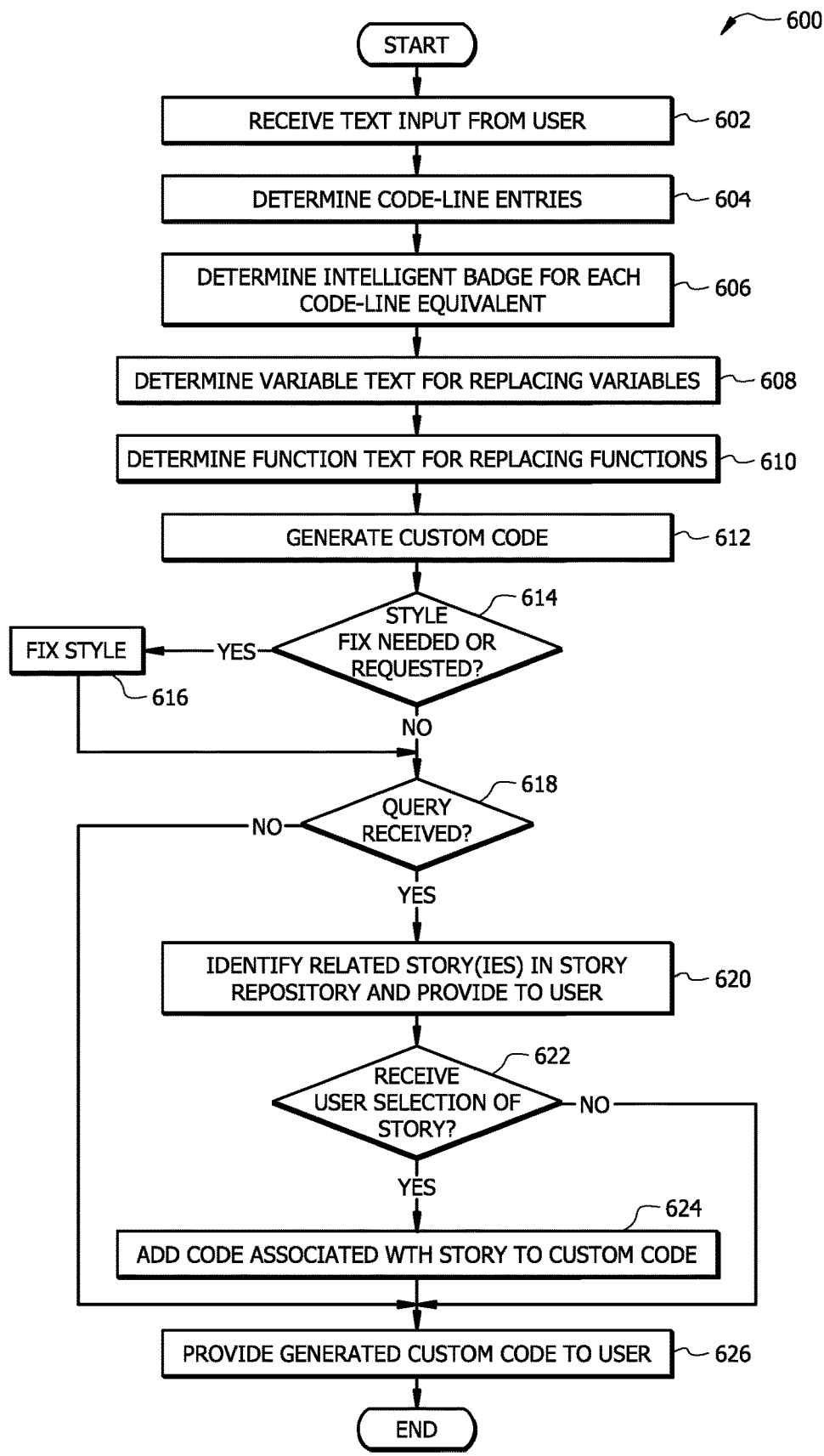
FIG. 6 is a flowchart illustrating an example method of operating the custom code generator of the system illustrated in FIG. 1.
Figure 7:
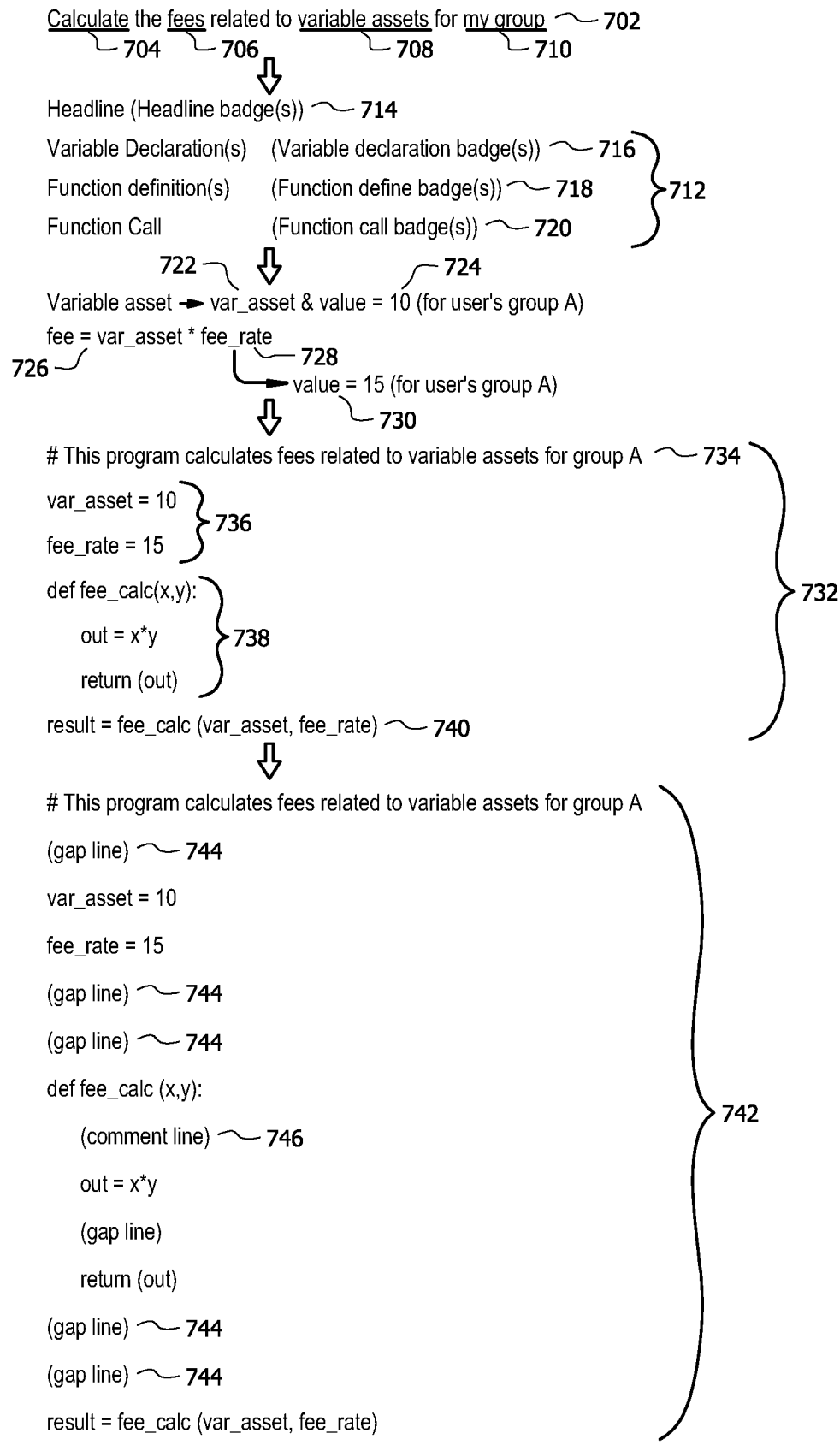
FIG. 7 illustrates examples of various elements associated with steps of the method of FIG. 6.

FIG. 6 is a flowchart of an example method 600 of generating custom code 140 using the custom code generator 130 of FIG. 1. The method 600 may be performed by the custom code generator 130 using the code writer 136 and/or style modifier 138. The method 600 may begin at step 602 where a natural-language user input 132 is received by the custom code generator 130. The input 132 generally includes a description of a computing task or function which a user 104a,b wishes to perform. The input 132 may also include an indication of a programming language in which to generate the custom code 140. The custom code generator 130 may use any appropriate natural language processing algorithm to process the user input 132, split the input 132 into subsections (e.g., split paragraphs into sentences or portions of sentences), and/or tag keywords in the input 132. FIG. 7 illustrates a portion 702 of a natural language user input 132. This example input portion 702 includes certain tagged keywords and phrases 704, 706, 708, and 710, which are used by the custom code generator 130 to generate custom code 140 using method 600.

Referring again to FIG. 6, at step 604, the custom code generator 130 may determine code-line entries to include in the custom code 140, based on the received natural-language input 132. For instance, words, phrases, or combinations of both included in the user input 132 may be used to determine code-line entries which should be included in the custom code 140. FIG. 7 illustrates example code-line entries 712 to include in a custom code 140 generated based on input portion 702. The code-line entries 712 include a headline entry 714, a variables declaration entry 716, a function definition entry 718, and a function call entry 720.

For example, the custom code generator may include a headline entry 714 in custom code 140 such that an initial comment line is provided that describes the use and/or operation of the custom code 140. The custom code generator 130 may determine that variable declarations 714 should be included based on the identification of keywords 706 and 708 (i.e., "fees" and "variable assets") in the input portion 702. Such keywords 706 and 708 may be associated with predefined variables by the custom code generator 130. The custom code generator 130 may determine that function definition 718 should be included based on the identification of keywords 704 and 706 (i.e., "calculate" and "fees"). Verbs, such as "calculate," appearing in the input portion 702 may be associated with functions used to perform actions associated the verbs (i.e., calculations in this example). The custom code generator 130 may determine that a function-call entry 720 should be included in order to execute the defined for the declared variables.

Referring again to FIG. 6, at step 606, an intelligent badge is determined for each code-line entry determined from the user input 132. Examples of intelligent badges 308 are illustrated in FIG. 3. FIG. 7 also illustrates example badges included in each code-line entry 714, 716, 718, 720. Badges may be used, for example, to more efficiently locate related stories 118 in the story repository 116. At step 608, variable-related words or phrases are identified in the user input 132 and used to determine appropriate variables variable values to use in the custom code 140 being generated. For instance, the custom code generator 130 may access information stored in the story repository 116, the source code repository 122, and/or the style repository 126 to determine appropriate variable names and values to include in the custom code 140. For instance, as illustrated in the example of FIG. 7, the "variable asset" keyword 708 may be associated with a "var_asset" variable 722. The custom code generator 130 may further determine a variable value 724 of ten for the "var_asset" variable 722. The custom code generator 130 may determine a calculation 726 associated with the "fee" keyword 706. This calculation 726 includes a further "fee_rate" variable 728, which has an associated variable value 730 of fifteen. The values 724 and 730 may be determined based on the user 104a,b who provided the user input portion 702. For example, the tagged "my group" phrase 710 of input portion 702 may be used to associate the variables 722 and 728 with the appropriate values 724 and 730 for the user 104a,b or the user's group (e.g., an entity or business group with which the user 104a,b is associated).

Referring to FIG. 6, at step 610, the custom code generator 130 determines functions to provide in place of function-related text identified in the user input 132. For instance, the source code generator 130 may identify certain words, phrases, or combinations of these in the user input 132 which are related to an established function (e.g., a function employed in any of the stored source code 124). As a non-limiting example, FIG. 7 illustrates, a determined calculation 726 associated with the input portion 702. The resulting custom code portion 732 (described further with respect to step 612 below) may include function-definition code 738 associated with the determined calculation 726.

Referring to FIG. 6, at step 612, custom code 140 is generated based on the determined function(s), variable(s), and badge(s) of steps 606, 608, and 610. An example of a determined code portion 732 is illustrated in FIG. 7. As shown in the example of FIG. 7, the code portion 732 includes a headline portion 734, a variable-declaration portion 736, the function-definition portion 738, and a function-call portion 740. The headline portion 734 is generally a summary of the operation or use of the code portion 732. The variable-declaration portion 736 defines the values of variables to include in the code portion 732. The function-definition portion 738, as described above with respect to step 610, defines calculations to include in the code portion 732 (i.e., the calculation indicated by the input portion 702). The function-call portion 740 generally includes code for calling the defined function 738 using the declared variables 736.

Referring to FIG. 6, at step 614, the custom code generator 130 may determine whether the style of the custom code 140 being generated should be edited (or "fixed") to correspond to an appropriate style for the user 104a,b who provided the user input 132 and/or to the group or entity with which the user 104a,b is affiliated (e.g., the entity associated with the tagged "my group" keyword 710 of the input portion 702). For instance, the custom code generator 130 (e.g., the style modifier 138) may compare style features of the code 140 generated at step 612 to predefined style features for the user 104a,b (e.g., from the user's style profile 128a,b). In some embodiments, step 614 may involve the approach described above with respect to FIG. 3. In such embodiments, if a positive anomaly determination 314 is made (i.e., when style features 302 of the custom code 140 do not correspond to predefined features 304), the custom code generator 130 proceeds to step 616 to adjust the code 140. Otherwise, if a negative anomaly determination 314 is made (i.e., when style features 302 of the custom code 140 correspond to predefined features 304), the custom code generator may proceed to step 618 without adjusting the custom code 140.

At step 616, the custom code generator 130 (e.g., the style modifier 138 of the custom code generator 130) edits the custom code 140 generated at step 612. The code 140 may be "fixed" such that the format or style of the code 140 is in accordance with the style profile 128a,b of the user 104a,b who provided the user input 132 received at step 602. The style is generally fixed by modifying the code 140 such that the style features are aligned with the user's predefined style features (e.g., as indicated by the user's style profile 128a,b). An example of such an adjustment is described above with respect to element 224 of FIG. 2 above. As a further example, FIG. 7 illustrates an example fixed code portion 742 where the code 732 has been modified to include style features 744 and 746, which bring the style of code portion 742 into accordance with the expected style of the user 104a,b who provided the user input portion 702. Fixed code portion 742 includes additional gap lines 744 and an additional comment line 746 not found in the code portion 732 generated at step 612.

Modifying or "fixing" code at step 616 may provide further improvements to the performance and reliability of the custom code 140 generated by the custom code generator 130, for example, by facilitating the generation of custom code 140 that is not only appropriate for performing certain desired tasks but also that meets quality standards associated with the style, format, and presentation of the custom code 140 (i.e., such that the custom code 140 is readable to appropriately trained programmers and can be trusted for use in future applications). Accordingly, custom code 140 may be particularly appropriate for storage in the source code repository 122 as an entry of the stored source code 124, such that the code 140 can be used in the future and repurposed, as needed, using the custom code generator 130.

At step 618, the custom code generator 130 may determine whether a user query 134 is received. As described above, a user query 134 generally corresponds to a request from the user 104a,b to identify and view or use an entry of stored source code 124. For instance, a user query 134 may include a natural-language question or search phrase for locating associated source code 124. If a user query 134 is not received at step 618, the custom code generator 130 provides, at step 626, the generated code 140 to the user 104a,b who provided the user input 132. The user 104a,b may then use the custom code 140 as desired.

If a user query is received at step 618, the custom code generator 130 may proceed to step 620 to identify one or more related stories 118 in the story repository 116. For instance, the custom code generator 130 may identify stories 118 with similar text to that of the user query 134. This identification may be performed using any appropriate text-based search algorithm. For instance, a keywords may be identified in the query 134, and stories 118 which include the same or associated keywords may identified and presented to the user 104a,b. At step 622, the custom code generator 130 determines whether a user selection of one or more of the presented stories 118 is received. If a user selection is not received at step 622, the custom code generator 130 generally proceeds to step 626. However, if a user selection is received at step 622, the custom code generator 130 proceeds to step 624.

At step 624, the custom code generator 130 may append the source code 124 corresponding to the selected story(ies) 118 to the custom source code 140 and/or provide the source code 124 corresponding to the selected story(ies) 118 to the user 104a,b who provided the user query 134. In some embodiments, the custom code generator 130 may provide suggestions for preferred source code 124 to include in the custom code 140. For instance, if a user query 134 involves a request to locate source code 124 associated with two functions being performed in series, the source code generator 130 may suggest a single entry of source code 124 which performs both functions in series as a preferred option compared to providing two separate entries of source code 124, which each perform only one of the desired functions. For instance, rather than providing a first entry of source code 124 for performing a first task and a second entry of source code 124 for performing a second task, the custom code generator 130 may instead only provide a preferred third entry of source code 124 the performs the first and second tasks sequentially.

In some embodiments, the custom code generator 130 may identify existing source code 124 for performing a desired task on a first set of variables (e.g., associated with a user input 132 and/or query 134) and repurpose this source code 124 to perform the same desired task (e.g., calculations) using a second set of variables which were identified in the user input 132 and/or query 134. As an example, the code generator 130 may receive a query 134 comprising a request to perform a computing task using a first set of variables. The custom code generator 130 may then identify (e.g., based on keywords identified in the query 134) a story 118 stored in the story repository 116, that is related to performing the second computing task. The identified story 118 may be presented to the user 104a,b. If the user 104a,b selected the story 118, the source code 124 corresponding to the story may be determined. If the source code 124 performs the desired task using a different set of variables, the source code 124 may be edited to replace the different set of variables with the set of variables indicated in the user query 134.

At step 626, the custom code 140 (e.g., as optionally modified at step 624) is provided to the user 104a,b. The user 104a,b may then use the custom code 140 as appropriate.

Example Device

Figure 8:
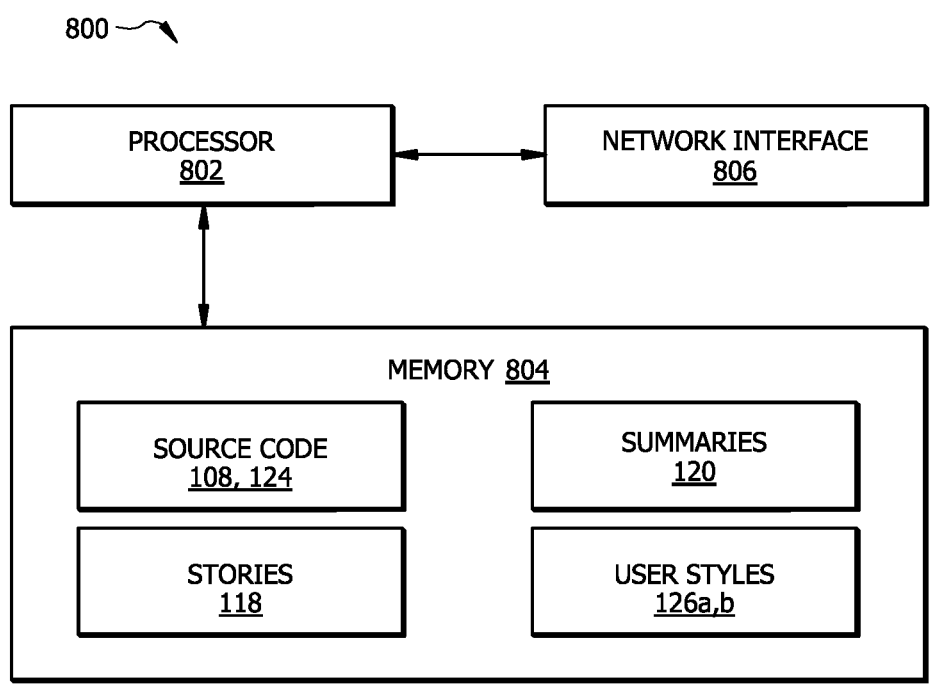
FIG. 8 is a diagram of an example device configured to implement the system of FIG. 1.

FIG. 8 is an embodiment of a device 800 configured to implement the query generation system 100. The device 800 comprises a processor 802, a memory 804, and a network interface 806. The device 800 may be configured as shown or in any other suitable configuration. The device 800 may be and/or may be used to implement computing devices 102a,b, source code analyzer 106, story repository 116, source code repository 122, style repository 126, and custom code generator 130 of FIG. 1.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804 and the network interface 806. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of methods 400 and 600. In an embodiment, the function described herein is implemented using logic units, FPGAs, ASICs, DSPs, or any other suitable hardware or electronic circuitry.

The memory 804 is operable to store source code 108, 124, stories 118, summaries 120, style profiles 128a,b, and any other data, instructions, logic, rules, or code operable to execute the function described herein. The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The network interface 806 is configured to enable wired and/or wireless communications. The network interface 806 is configured to communicate data between the device 800 and other network devices, systems, or domain(s). For example, the network interface 806 may comprise a WIFI interface, a local area network (LAN) interface, a wide area network (WAN) interface, a modem, a switch, or a router. The processor 802 is configured to send and receive data using the network interface 806. The network interface 806 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a source code repository configured to store source code entries associated with a plurality of users, each source code entry comprising instructions in a programming language for performing a computing task; and
   a code generator communicatively coupled to the source code repository, the code generator comprising a processor configured to:
   receive an input comprising a request to perform a first computing task;
   identify keywords in the input, the keywords comprising at least one first keyword and at least one second keyword;
   determine, based on the identified keywords, code-line entries which, when executed in an ordered combination, achieve the first computing task;
   determine, based on the at least one first keyword, one or more variables appearing in the source code entries of the source code repository to declare in order to perform the first computing task;
   determine, based on the at least one second keyword, one or more functions appearing in the source code entries of the source code repository to define and call to perform the first computing task;
   generate custom code in the programming language;
   determine style features of the generated custom code, the style features comprising formatting characteristics of the custom code that are specific to a particular user, the determined style features comprising a first feature; and
   in response to determining that at least the first feature is outside a corresponding first threshold range of a first predefined feature associated with the particular user, automatically edit the first feature such that the edited first feature is within the first threshold range of the first predefined feature associated with the particular user;
   a style repository configured to store a style profile for each of the plurality of users, each style profile comprising predefined style features, the predefined style features comprising formatting characteristics of the source code entries of the source code repository prepared by the corresponding user of the plurality of users, wherein the first predefined feature associated with the particular user is stored in the style repository;
   wherein the processor is further configured to determine whether the style features correspond to predefined style features associated with the particular user by:
   determining a second feature of the custom code;
   comparing the second feature to a corresponding second predefined feature of the predefined style features;
   determining, based on second results of the comparison of the second feature to the corresponding second predefined feature, that the second feature is within a second threshold range of the second predefined feature;
   determining a third feature of the custom code;
   comparing the third feature to a corresponding third predefined feature of the predefined style features;
   determining, based on third results of the comparison of the third feature to the corresponding third predefined feature, that the third feature is within a third threshold range of the third predefined feature;
   in response to determining that both the second feature is within the corresponding second threshold range of the second predefined feature and the third feature is within the corresponding third threshold range of the third predefined feature, determining that the style features correspond to predefined style features associated with a first style profile; and
   in response to determining that at least one of the second feature is outside the corresponding second threshold range of the second predefined feature and the third feature is outside the corresponding third threshold range of the third predefined feature, determining that the style features do not correspond to the predefined style features associated with the first style profile.

2. The system of claim 1, wherein the processor is further configured to:
   determine that the style features do not correspond to predefined style features indicated by a first style profile associated with the particular user; and
   in response to determining that the style features do not correspond to the predefined style features indicated by the first style profile associated with the particular user, automatically edit the custom code such that the style features correspond to the predefined style features indicated by the first style profile associated with the particular user.

3. The system of claim 1, wherein the processor is further configured to:
   after automatically editing the first feature such that the edited first feature is within the first threshold range of the first predefined feature, provide the custom code with the edited first feature to the particular user.

4. The system of claim 1, further comprising:
a story repository configured to store natural-language descriptions of the source code entries stored in the source code repository; and
the code generator communicatively coupled to the story repository, the processor further configured to:
identify, based on the keywords identified in the input, a first natural-language description stored in the story repository, wherein the first natural-language description is related to performing the first computing task;
determine a first source code entry stored in the source code repository that is associated with the identified first natural-language description, wherein the first source code entry comprises instructions, in the programming language, for performing the first computing task; and
include at least a portion of the determined first source code entry in the custom code.

5. The system of claim 1, further comprising:
a story repository configured to store natural-language descriptions of the source code entries stored in the source code repository; and
the code generator communicatively coupled to the story repository, the processor further configured to:
receive a user query comprising a request to perform a second computing task using a first set of variables;
identify, based on keywords identified in the user query, a first natural-language description stored in the story repository, wherein the first natural-language description is related to performing the second computing task;
present the first natural-language description to the particular user;
receive a selection of the first natural-language description from the particular user;
determine a first source code entry stored in the source code repository that is associated with the first natural-language description, wherein the first source code entry comprises instructions, in the programming language, for performing the second computing task using a second set of variables;
edit the first source code entry by replacing the second set of variables with the first set of variables; and
provide the edited first source code entry to the particular user.

6. The system of claim 1, further comprising:
a story repository configured to store natural-language descriptions of the source code entries stored in the source code repository; and
the code generator communicatively coupled to the story repository, the processor further configured to:
receive a user query comprising a request to perform, sequentially, an initial computing task followed by a subsequent computing task;
identify, based on keywords identified in the user query, a first natural-language description stored in the story repository associated with performing the initial computing task;
identify, based on keywords identified in the user query, a second natural-language description stored in the story repository associated with performing the subsequent computing task;
identify, based on keywords identified in the user query, a third natural-language description stored in the story repository associated with sequentially performing the initial computing task followed by the subsequent computing task;
present only the third natural-language description to the particular user for selection; and
in response to receiving a selection of the third natural-language description from the particular user, provide a first source code entry associated with the third natural-language description to the particular user.

7. A method comprising:
receiving an input comprising a request to perform a first computing task;
identifying keywords in the input, the keywords comprising at least one first keyword and at least one second keyword;
determining, based on the identified keywords, code-line entries which, when executed in an ordered combination, achieve the first computing task;
determining, based on the at least one first keyword, one or more variables appearing in source code entries stored in a source code repository to declare in order to perform the first computing task, wherein the source code repository is configured to store the source code entries and each source code entry comprises instructions in a programming language for performing a computing task;
determining, based on the at least one second key word, one or more functions appearing in the source code entries of the source code repository to define and call to perform the first computing task;
generating custom code in the programming language;
determining style features of the generated custom code, the style features comprising formatting characteristics of the custom code that are specific to a particular user, the determined style features comprising a first feature; and
in response to determining that at least the first feature is outside a corresponding first threshold range of a first predefined feature associated with the particular user, automatically editing the first feature such that the edited first feature is within the first threshold range of the first predefined feature associated with the particular user;
determining whether the style features correspond to predefined style features associated with the particular user by:
determining a second feature of the custom code;
comparing the second feature to a corresponding second predefined feature of the predefined style features;
determining, based on second results of the comparison of the second feature to the corresponding second predefined feature, that the second feature is within a second threshold range of the second predefined feature;
determining a third feature of the custom code;
comparing the third feature to a corresponding third predefined feature of the predefined style features;
determining, based on third results of the comparison of the third feature to the corresponding third predefined feature, that the third feature is within a third threshold range of the third predefined feature;
in response to determining that both the second feature is within the corresponding second threshold range of the second predefined feature and the third feature is within the corresponding third threshold range of the third predefined feature, determining that the style features correspond to predefined style features associated with a first style profile; and in response to determining that at least one of the second feature is outside the corresponding second threshold range of the second predefined feature and the third feature is outside the corresponding third threshold range of the third predefined feature, determining that the style features do not correspond to the predefined style features associated with the first style profile.

8. The method of claim 7, further comprising:

determining that the style features do not correspond to predefined style features associated with the particular user, wherein the first style profile is stored in a style repository, wherein the style repository is configured to store a style profile for each of the plurality of users, each style profile comprising predefined style features, the predefined style features comprising formatting characteristics of the source code entries of the source code repository prepared by the corresponding user of the plurality of users, wherein the first predefined feature associated with the particular user is stored in the style repository; and in response to determining that the style features do not correspond to the predefined style features associated with the particular user, automatically editing the custom code such that the style features correspond to the predefined style features associated with the particular user.

9. The method of claim 7, further comprising:

after automatically editing the first feature such that the edited first feature is within the first threshold range of the first predefined feature, providing the custom code with the edited first feature to the particular user.

10. The method of claim 7, further comprising:

identifying, based on the keywords identified in the input, a first natural-language description stored in a story repository, wherein the first natural-language description is related to performing the first computing task, wherein the story repository is configured to store natural-language descriptions of the source code entries stored in the source code repository;

determining a first source code entry stored in the source code repository that is associated with the identified first natural-language description, wherein the first source code entry comprises instructions, in the programming language, for performing the first computing task; and including at least a portion of the determined first source code entry in the custom code.

11. The method of claim 7, further comprising:

receiving a user query comprising a request to perform a second computing task using a first set of variables;

identifying, based on keywords identified in the user query, a first natural-language description stored in a story repository, wherein the first natural-language description is related to performing the second computing task, wherein the story repository is configured to store natural-language descriptions of the source code entries stored in the source code repository;

presenting the first natural-language description to the particular user;

receiving a selection of the first natural-language description from the particular user;

determining a first source code entry stored in the source code repository that is associated with the first natural-language description, wherein the first source code entry comprises instructions, in the programming language, for performing the second computing task using a second set of variables;

editing the first source code entry by replacing the second set of variables with the first set of variables; and providing the edited first source code entry to the particular user.

12. The method of claim 7, further comprising:

receiving a user query comprising a request to perform, sequentially, an initial computing task followed by a subsequent computing task;

identifying, based on keywords identified in the user query, a first natural-language description stored in a story repository associated with performing the initial computing task, wherein the story repository is configured to store natural-language descriptions of the source code entries stored in the source code repository;

identifying, based on keywords identified in the user query, a second natural-language description stored in the story repository associated with performing the subsequent computing task;

identifying, based on keywords identified in the user query, a third natural-language description stored in the story repository associated with sequentially performing the initial computing task followed by the subsequent computing task;

presenting only the third natural-language description to the particular user for selection; and in response to receiving a selection of the third natural-language description from the particular user, providing a first source code entry associated with the third natural-language description to the particular user.

13. A device, comprising:

a memory configured to store:

a source code repository comprising source code entries associated with a plurality of users, each source code entry comprising instructions in a programming language for performing a computing task; and a style repository comprising a style profile for each of the plurality of users, each style profile comprising predefined style features, the predefined style features comprising formatting characteristics of the source code entries of the source code repository prepared by the corresponding user of the plurality of users, wherein a first predefined feature associated with a particular user is stored in the style repository; and a hardware processor communicatively coupled to the memory, the hardware processor configured to:

receive an input comprising a request to perform a first computing task;

identify keywords in the input, the keywords comprising at least one first keyword and at least one second keyword;

determine, based on the identified keywords, code-line entries which, when executed in an ordered combination, achieve the first computing task;

determine, based on the at least one first keyword, one or more variables appearing in the source code entries of the source code repository to declare in order to perform the first computing task;

determine, based on the at least one second keyword, one or more functions appearing in the source code entries of the source code repository to define and call to perform the first computing task;

generate custom code in the programming language;
determine style features of the generated custom code, the style features comprising formatting characteristics of the custom code that are specific to a particular user, the determined style features comprising a first feature; and
in response to determining that at least the first feature is outside a corresponding first threshold range of the first predefined feature associated with the particular user, automatically edit the first feature such that the edited first feature is within the first threshold range of the first predefined feature associated with the particular user;
determine whether the style features correspond to predefined style features associated with the particular user by:
determining a second feature of the custom code;
comparing the second feature to a corresponding second predefined feature of the predefined style features;
determining, based on second results of the comparison of the second feature to the corresponding second predefined feature, that the second feature is within a second threshold range of the second predefined feature;
determining a third feature of the custom code;
comparing the third feature to a corresponding third predefined feature of the predefined style features;
determining, based on third results of the comparison of the third feature to the corresponding third predefined feature, that the third feature is within a third threshold range of the third predefined feature;
in response to determining that both the second feature is within the corresponding second threshold range of the second predefined feature and the third feature is within the corresponding third threshold range of the third predefined feature, determining that the style features correspond to predefined style features associated with a first style profile; and
in response to determining that at least one of the second feature is outside the corresponding second threshold range of the second predefined feature and the third feature is outside the corresponding third threshold range of the third predefined feature, determining that the style features do not correspond to the predefined style features associated with the first style profile.

14. The device of claim 13, wherein the processor is further configured to:
determine that the style features do not correspond to predefined style features indicated by a first style profile associated with the particular user; and
in response to determining that the style features do not correspond to the predefined style features indicated by the first style profile associated with the particular user, automatically edit the custom code such that the style features correspond to the predefined style features indicated by the first style profile associated with the particular user.

15. The device of claim 13, wherein the processor is further configured to:
after automatically editing the first feature such that the edited first feature is within the first threshold range of the first predefined feature, provide the custom code with the edited first feature to the particular user.

16. The device of claim 13, wherein the memory is further configured to store a story repository comprising natural-language descriptions of the source code entries stored in the source code repository; and
the processor is further configured to:
identify, based on the keywords identified in the input, a first natural-language description stored in the story repository, wherein the first natural-language description is related to performing the first computing task;
determine a first source code entry stored in the source code repository that is associated with the identified first natural-language description, wherein the first source code entry comprises instructions, in the programming language, for performing the first computing task; and
include at least a portion of the determined first source code entry in the custom code.

17. The device of claim 13, wherein the memory is further configured to store a story repository comprising natural-language descriptions of the source code entries stored in the source code repository; and
the processor is further configured to:
receive a user query comprising a request to perform a second computing task using a first set of variables;
identify, based on keywords identified in the user query, a first natural-language description stored in the story repository, wherein the first natural-language description is related to performing the second computing task;
present the first natural-language description to the particular user;
receive a selection of the first natural-language description from the particular user;
determine a first source code entry stored in the source code repository that is associated with the first natural-language description, wherein the first source code entry comprises instructions, in the programming language, for performing the second computing task using a second set of variables;
edit the first source code entry by replacing the second set of variables with the first set of variables; and
provide the edited first source code entry to the particular user.

* * * * *